Patented Apr. 13, 1926.

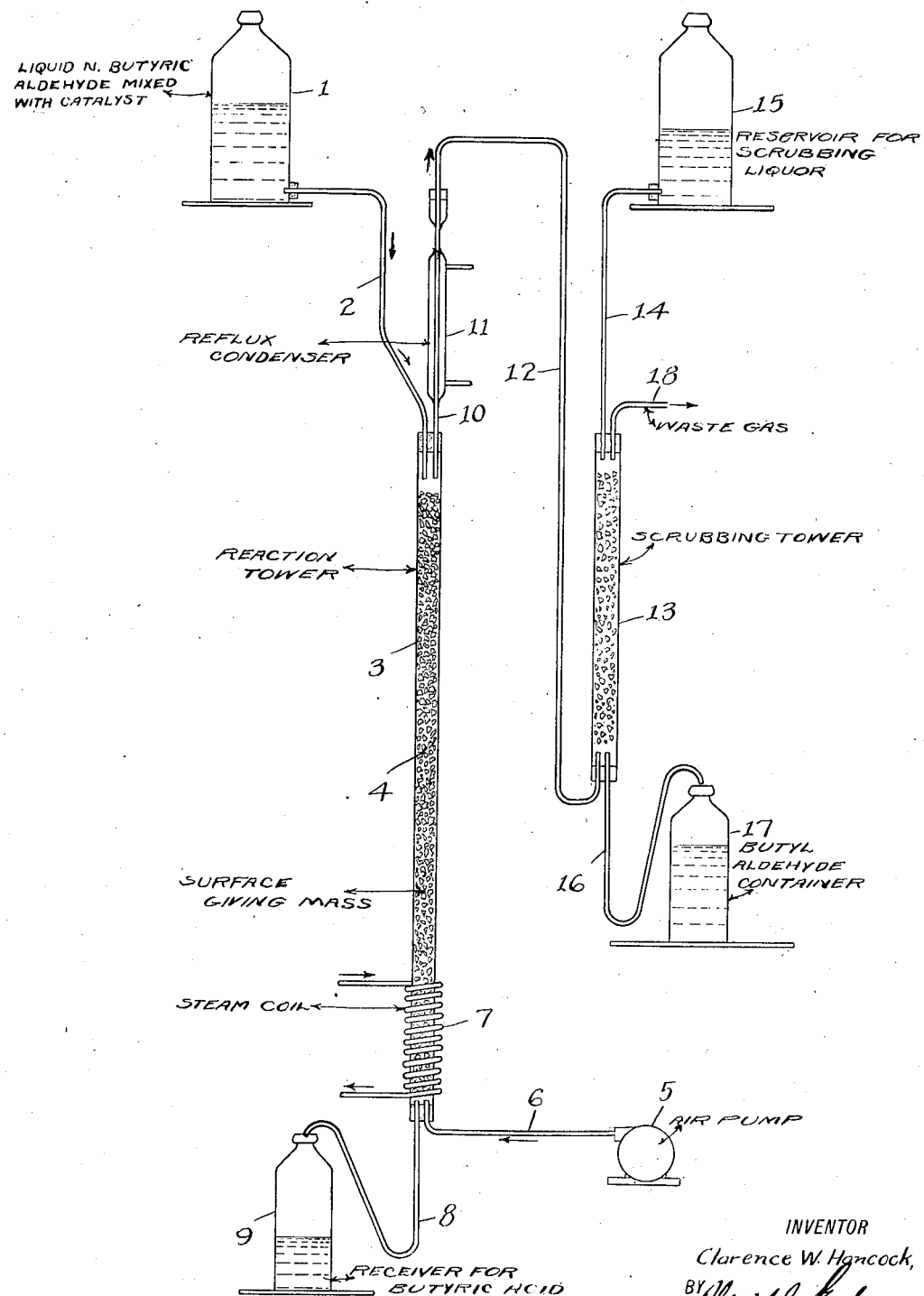

1,580,137

UNITED STATES PATENT OFFICE.

CLARENCE W. HANCOCK, OF TERRE HAUTE, INDIANA, ASSIGNOR TO COMMERCIAL SOLVENTS CORPORATION, OF TERRE HAUTE, INDIANA, A CORPORATION OF MARYLAND.

MANUFACTURE OF NORMAL BUTYRIC ACID FROM BUTYL ALDEHYDE.

Application filed August 31, 1922. Serial No. 585,341.

*To all whom it may concern:*

Be it known that I, CLARENCE W. HANCOCK, a subject of Great Britain, and a resident of the city of Terre Haute, in the county of Vigo and State of Indiana, have invented certain new and useful Improvements in the Manufacture of Normal Butyric Acid from Butyl Aldehyde, of which the following is a specification, reference being made to the accompanying drawings, forming a part thereof.

Normal butyl aldehyde which is formed by the oxidation of butyl alcohol has been heretofore converted into butyric acid by passing air or oxygen through the aldehyde in the form of bubbles in the presence of a catalytic agent and lumps of glass to cause entrainment of the oxygen and give increased surface action. Such process is very slow and intermittent in action and furthermore is not practical for large scale industrial operations; it also involves a considerable loss of the aldehyde through entrainment and volatilization in the nitrogen and the temperatures at which the operation is carried out must be controlled by outside means.

The objects of my invention are, among other things, to provide a novel simplified method for the conversion of normal butyl aldehyde into butyric acid which method shall be continuous in its action and will result in the production of butyric acid at a very much higher rate than in prior known methods. A further novel feature of my improved method is that it is carried out with temperatures due to exothermic heat of reaction during the conversion which are practically uniform and are controlled only by the relative rate of feed of air and aldehyde in producing such reactions resulting in the oxidation of the aldehyde and its conversion into butyric acid in a constant flow with a rate of production far in excess of other known methods.

The accompanying drawings show in diagrammatic form by way of example an apparatus adapted to carry out my improved method in a continuous manner.

The normal butyric aldehyde in liquid form is mixed with a suitable oxygen carrying catalyst which is soluble in liquid butyraldehyde and butyric acid for example, with 0.5% by weight of manganese butyrate. Other metallic salts of butyric acid which are soluble in butyric acid and butyl aldehyde may be used such as those of iron. The mixture is placed in the reservoir 1 and flows through the pipe 2 to the converter tube or tower 3 which is several feet in length, glass-lined and is filled with broken glass or porcelain 4 to provide a surface-giving mass. The stream of normal butyraldehyde and catalyst from the pipe 2 trickles slowly down through the tower 3 over the broken glass or porcelain 4 against a counter-current of warm gas rich in free oxygen such as atmospheric air, the temperature of which ranges from 21° C. to 40° C. Such air or gas suitably heated preferably to approximately 35° C. is forced by the pump 5 through the pipe 6 to the base of the tower 3, the pressure varying from atmospheric to a static pressure of four or five inches of water, such head being maintained merely to cause the air or gas to pass upwardly through the tower 3 with sufficient oxygen therein to produce a rapid reaction.

This counter-current of warm gas containing free oxygen sets up an energetic oxidation of the aldehyde trickling down through the tower 3 over the broken glass 4, creating temperatures ranging between 50° C. to about 75° C. depending upon the amount of catalytic agent initially mixed with the aldehyde, and also depending upon the relative rates of flow of gas and butyl aldehyde. I have found the most desirable temperatures in the tower 3 to be between 65° and 75° C. The reaction taking place in the tower 3 is highly exothermic, and no external heating is required with the exception of a small steam coil 7 arranged about the base of the tower 3 which coil assists in maintaining a uniform temperature through the entire length of the tower 3.

The following equation expresses the reaction taking place in the tower 3:—

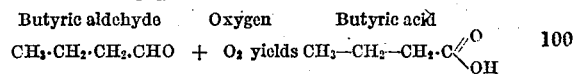

The butyric acid produced flows continuously out of the tower 3 through the U-shaped tube 8 to the receiver 9.

Excess gas passes out from the tower 3 through the pipe 10 to the reflux condenser 11 located as shown near the top of the tower, and thence passes through the tube 12 to the bottom of the scrubbing tower 13 and flows upwardly against a countercurrent of scrubbing liquor, such as butyl alcohol, which is admitted to the tower 13 through the pipe 14 from the reservoir 15. Other solvents could be used in place of butyl alcohol. The butyl aldehyde entrained with the scrubbing liquor in the tower 13 passes through the tube 16 and is recovered in the container 17, while the waste gas passes outwardly from the tower 13 through the pipe 18 to the atmosphere.

The crude butyric acid produced by my novel method and collected in the receiver 9 averages 80 to 85% pure butyric acid.

The following comparison of experiments will indicate in a measure the advantages obtained in using my improved counter-current method over the bubbling method hereinbefore referred to. In each instance the tower 3 was 42 inches in length and had a diameter of 1½ inches, the tower being packed with broken glass. In the experiment with the bubbling method this tower was filled with normal liquid alhehyde and a catalytic agent, and air was bubbled through the tower; in the experiment according to my method a stream of normal butyraldehyde and catalyst was allowed to trickle down slowly through the tower 3 while passing upwardly a counter-current of air. In both examples one percentum (1%) of manganese butyrate was used as a catalyst.

Bubbling method.

| | |
|---|---|
| Volume of liquid | 324cc. |
| Percentage of conversion after 22 hours | 30% |
| Rate of production of butyric acid per minute | 4.4cc. |

My counter-current method.

| | |
|---|---|
| Percentage of conversion in one passage | 60% |
| Rate of production of butyric acid per minute | 72cc. |

It will be understood that many modifications may be made in the form and arrangement of the apparatus for carrying out my improved method of converting the normal butyraldehyde into butyric acid without changing the principle of its operation, and that the temperature and pressure of the gas containing free oxygen forming the counter-current may be widely varied; also that small amounts of butyric acid (2 to 5%) may be added to the mixture of butyraldehyde and catalyst to keep the latter in solution as well as to aid the reaction.

I claim as my invention:

1. The method of manufacturing butyric acid from normal liquid butyl aldehyde which comprises adding to the aldehyde a therein soluble oxygen-carrying catalyst, trickling the mixture through a surface-giving mass, and maintaining the temperature through said mass between 65° and 75° C. by passing a counter-current of oxygen through said mixture.

2. The method of manufacturing butyric acid from normal liquid butyl aldehyde which comprises adding to the aldehyde a therein soluble oxygen-carrying catalyst, trickling the mixture through a surface-giving mass, and maintaining the temperature through said mass between 65° and 75° C. by passing a counter-current of oxygen at a temperature of from 21° to 40° C. through said mixture.

3. In the method of manufacturing butyric acid from normal liquid butyl aldehyde the step which consists in continuously effecting a reaction between counter-currents of the aldehyde and oxygen in the presence of a catalyst soluble in the butyl aldehyde while maintaining the temperature between 65° and 75° C.

4. The method of manufacturing butyric acid from normal liquid butyl aldehyde which comprises adding to the aldehyde a therein soluble oxygen-carrying catalyst, continuously trickling the mixture through a surface-giving mass, and maintaining the temperature through said mass between 65° and 75° C. by continuously passing a counter-current of oxygen through said mixture.

5. The method of manufacturing butyric acid from normal liquid butyl aldehyde which comprises adding to the aldehyde a therein soluble oxygen-carrying catalyst, continuously trickling the mixture through a surface-giving mass, and maintaining the temperature through said mass between 65° and 75° C. by continuously passing a counter-current of oxygen at a temperature of from 21° to 40° C. through said mixture.

6. The method of manufacturing butyric acid from normal liquid butyl aldehyde which comprises adding to the aldehyde a small quantity of manganese butyrate, trickling the mixture through a surface-giving mass, and maintaining the temperature through said mass between 65° and 75° C. by passing a counter-current of oxygen through said mixture.

7. The method of manufacturing butyric acid from normal liquid butyl aldehyde which comprises adding to the aldehyde a small quantity of manganese butyrate, trickling the mixture through a surface-giving mass, and maintaining the temperature through said mass between 65° and 75° C. by passing a counter-current of oxygen at a temperature of from 21° to 40° C. through said mixture.

8. The method of manufacturing butyric acid from normal liquid butyl aldehyde which comprises adding to the aldehyde a small quantity of manganese butyrate, continuously trickling the mixture through a surface-giving mass, and maintaining the temperature through said mass between 65° and 75° C. by continuously passing a counter-current of oxygen through said mixture.

9. The method of manufacturing butyric acid from normal liquid butyl aldehyde which comprises adding to the aldehyde a small quantity of manganese butyrate, continuously trickling the mixture through a surface-giving mass, and maintaining the temperature through said mass between 65° and 75° C. by continuously passing a counter-current of oxygen at a temperature of from 21° to 40° C. through said mixture.

10. The method of manufacturing butyric acid from normal liquid butyl aldehyde, which comprises trickling a mixture of liquid aldehyde and a therein soluble oxygen-carrying catalyst through a tower containing a surface-giving mass while passing a counter-current of oxygen through the mixture distributed over the mass with the reaction temperature in the tower maintained at substantial uniformity between 65° and 75° C. by controlling the rate of flow of said oxygen current and maintaining its initial temperature in the tower between 21° and 40° C.

11. The method of manufacturing butyric acid from normal liquid butyl aldehyde, which comprises continuously trickling a mixture of liquid aldehyde and a therein soluble oxygen-carrying catalyst through a tower containing a surface-giving mass while continuously passing a counter-current of oxygen through the mixture distributed over the mass with the reaction temperature in the tower maintained at substantial uniformity between 65° and 75° C. by controlling the rate of flow of said oxygen current and maintaining its initial temperature in the tower between 21° and 40° C.

12. The method of manufacturing butyric acid from normal liquid butyl aldehyde which comprises trickling a mixture of liquid aldehyde and a small quantity of manganese butyrate through a tower containing a surface-giving mass while passing a counter current of oxygen through the mixture distributed over the mass with the reaction temperature in the tower maintained at substantial uniformity between 65° and 75° C. by controlling the rate of flow of said oxygen current and maintaining its initial temperature in the tower between 21° and 40° C.

13. The method of manufacturing butyric acid from normal liquid butyl aldehyde, which comprises continuously trickling a mixture of liquid aldehyde and a small quantity of manganese butyrate through a tower containing a surface-giving mass while continuously passing a counter-current of oxygen through the mixture distributed over the mass with the reaction temperature in the tower maintained at substantial uniformity between 65° and 75° C. by controlling the rate of flow of said oxygen current and maintaining its initial temperature in the tower between 21° and 40° C.

CLARENCE W. HANCOCK.